(12) United States Patent
Mayo et al.

(10) Patent No.: US 12,422,584 B2
(45) Date of Patent: Sep. 23, 2025

(54) TUBE WAVE ANALYSIS OF WELL COMMUNICATION

(71) Applicant: SCHLUMBERGER TECHNOLOGY CORPORATION, Sugar Land, TX (US)

(72) Inventors: John Thomas Mayo, Stafford, TX (US); Andrey Vladimirovich Bogdan, Richmond, TX (US); Adam Ethan Keilers, Richmond, TX (US); Dmitriy Usoltsev, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/407,032

(22) Filed: Jan. 8, 2024

(65) Prior Publication Data
US 2024/0151870 A1 May 9, 2024

Related U.S. Application Data

(63) Continuation of application No. 16/308,641, filed as application No. PCT/US2017/038207 on Jun. 20, 2017, now Pat. No. 11,921,248.
(Continued)

(51) Int. Cl.
G01V 1/50 (2006.01)
E21B 43/25 (2006.01)
(Continued)

(52) U.S. Cl.
CPC .............. G01V 1/50 (2013.01); E21B 43/25 (2013.01); E21B 47/06 (2013.01); E21B 47/18 (2013.01);
(Continued)

(58) Field of Classification Search
CPC ... G01V 1/50; G01V 1/42; G01V 1/48; G01V 2210/163; G01V 2210/6222;
(Continued)

(56) References Cited

U.S. PATENT DOCUMENTS 5,963,508 A   10/1999  Withers
6,192,316 B1   2/2001  Hornby
(Continued)

FOREIGN PATENT DOCUMENTS

WO        2014100274 A1    6/2014

OTHER PUBLICATIONS

Komar, C. A., and L. Z. Shuck. "Pressure responses from induced hydraulic fractures in adjacent wells within a petroleum reservoir: an experiment." Jouranl of Petroleum Technology 27, No. 08 (1975): 951-952 (Year: 1975).*
(Continued)

Primary Examiner — Douglas Kay
(74) Attorney, Agent, or Firm — Jeffrey D. Frantz

(57) ABSTRACT

A pressure wave is generated within a first well extending into a subterranean formation. A pressure response associated with the pressure wave is detected from a second well extending into the formation. Information is then determined, based on the pressure response in the second well, wherein the information is associated with at least one of the formation and a fracture connected to at least one of the first well and the second well.

20 Claims, 6 Drawing Sheets

Related U.S. Application Data

(60) Provisional application No. 62/352,376, filed on Jun. 20, 2016.

(51) Int. Cl.
| | | |
|---|---|---|
| *E21B 47/06* | (2012.01) | |
| *E21B 47/18* | (2012.01) | |
| *E21B 49/00* | (2006.01) | |
| *G01V 1/42* | (2006.01) | |
| *G01V 1/48* | (2006.01) | |

(52) U.S. Cl.
CPC .............. *E21B 49/006* (2013.01); *G01V 1/42* (2013.01); *G01V 1/48* (2013.01); *G01V 2210/163* (2013.01); *G01V 2210/6222* (2013.01); *G01V 2210/6248* (2013.01)

(58) Field of Classification Search
CPC . G01V 2210/6248; E21B 43/25; E21B 47/06; E21B 47/18; E21B 49/006
See application file for complete search history.

(56) References Cited

U.S. PATENT DOCUMENTS

| | | | |
|---|---|---|---|
| 6,591,193 | B2 | 7/2003 | Krebs |
| 7,100,688 | B2 | 9/2006 | Stephenson et al. |
| 7,819,188 | B2 | 10/2010 | Auzerais et al. |
| 9,080,438 | B1 | 7/2015 | McCoy |
| 9,322,260 | B2 | 4/2016 | Potapenko et al. |
| 9,574,435 | B2 | 2/2017 | McCoy |
| 9,574,442 | B1 | 2/2017 | McCoy |
| 9,587,481 | B2 | 3/2017 | McCoy |
| 9,593,548 | B2 | 3/2017 | Hill |
| 9,896,927 | B2 | 2/2018 | McCoy |
| 10,550,836 | B2 | 2/2020 | Shampine |
| 10,607,170 | B1* | 3/2020 | Basu ................ G06Q 10/06313 |
| 11,921,248 | B2* | 3/2024 | Mayo ....................... G01V 1/48 |
| 2004/0206494 | A1 | 10/2004 | Stephenson et al. |
| 2006/0034152 | A1* | 2/2006 | Korneev ................ G01V 1/50 |
| | | | 367/31 |
| 2009/0260823 | A1* | 10/2009 | Prince-Wright .......... E21B 4/04 |
| | | | 166/302 |
| 2009/0276100 | A1* | 11/2009 | Malki .................... E21B 49/008 |
| | | | 700/282 |
| 2011/0141846 | A1 | 6/2011 | Uhl |
| 2011/0174490 | A1 | 7/2011 | Taylor |
| 2011/0267922 | A1 | 11/2011 | Shampine et al. |
| 2012/0018150 | A1 | 1/2012 | Shampine et al. |
| 2012/0092960 | A1 | 4/2012 | Gaston |
| 2012/0168151 | A1 | 7/2012 | Taylor |
| 2012/0285692 | A1* | 11/2012 | Potapenko ............ E21B 33/138 |
| | | | 166/308.1 |
| 2013/0079935 | A1* | 3/2013 | Kabannik ................ G05D 7/00 |
| | | | 700/282 |
| 2014/0284058 | A1* | 9/2014 | Watson ................... E21B 43/26 |
| | | | 166/308.1 |
| 2015/0142319 | A1 | 5/2015 | McCoy |
| 2015/0159477 | A1* | 6/2015 | Lecerf .................. E21B 43/267 |
| | | | 166/250.1 |
| 2015/0176395 | A1 | 6/2015 | McCoy |
| 2015/0308257 | A1 | 10/2015 | McCoy |
| 2016/0061022 | A1 | 3/2016 | McCoy |
| 2016/0237814 | A1 | 8/2016 | Fripp |
| 2017/0247995 | A1 | 8/2017 | Crews et al. |
| 2018/0187538 | A1 | 7/2018 | Walters |
| 2018/0238155 | A1 | 8/2018 | Nguyen |
| 2018/0245443 | A1 | 8/2018 | Nguyen |
| 2018/0252084 | A1 | 9/2018 | Nguyen |
| 2019/0024489 | A1 | 1/2019 | Nguyen |

OTHER PUBLICATIONS

"Properties of low-frequency trapped mode in viscous fluid waveguides," Nikitin, A., Plyushchenkov, B., and Segal, A. (2016), Geophysical Prospecting.

"Stoneley Wave Properties in a Fracture Filled with Viscous Fluid," Nikitin, A., Plyushchenkov, B., and Segal, A. (2013), Poromechanics V: pp. 183-192, DOI: 10.1061/9780784412992.021.

"Low-Frequency Stoneley Wave in Poroelastic Waveguides," A. Segal, A. Nikitin, and B. Plyushchenkov, 75th EAGE Conference & Exhibition incorporating SPE EUROPEC 2013, Session: Fractured Reservoirs, DOI: 10.3997/2214-4609.20130807.

International Search Report and Written Opinion issued in International Patent Appl. No. PCT/US2017/038207 issued Sep. 26, 2017; 18 pages.

Paluszny and Matthai, "Numerical modeling of descrete multi-crack growth applied to pattern formation in geological brittle media", Interntional Journal of Solids and Structures 46 (2009) 3383-3397 (Year: 2009).

Komar and Shuck, "Pressure Responses From Induced Hydraulic Fractures in Adjacent Wells Within a Petroleum Reservoir: An Experiment", SPE 5006, Journal of Petroleum Technology, pp. 951-952, Aug. 1965 (Year: 1965).

Pyecroft et al., "Interwell Hydraulic Fracutre Interaction Between Mulitstage Stimulated Wells and Multi Zone Slant Open Hole Observation Well . . . ", SPE-179174-MS, the SPE Hydraulic Fracturing Technology Conference held in The Woodlands, TX, USA, Feb. 9-11, 2016 (Year: 2016).

* cited by examiner

TUBE WAVE ANALYSIS OF WELL COMMUNICATION

CROSS-REFERENCE TO RELATED APPLICATIONS

This application is a continuation of U.S. patent application Ser. No. 16/308,641, filed Dec. 10, 2018, which is a National Stage Entry of International Application No. PCT/US2017/038207, filed Jun. 20, 2017, which claims priority to and the benefit of U.S. Provisional Application No. 62/352,376, titled "METHODS OF TUBE WAVE ANALYSIS OF WELL COMMUNICATION TO DEFINE FRACTURE GEOMETRY," filed Jun. 20, 2016. Each of the above applications is expressly incorporated herein by reference.

BACKGROUND

Pressure waves propagating in a subterranean formation reflect when encountering changes in the characteristic impedance of the formation matrix. Analysis of such waves can be utilized to determine information about features of a wellbore extending into the formation. Existing references that describe such analysis include U.S. Patent Application Publication Nos. 2011/0267922 and 2012/0018150, and U.S. Pat. No. 7,819,188, the disclosures of which are hereby incorporated herein by reference in their entirety.

SUMMARY

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method that includes generating a pressure wave within a first well extending into a subterranean formation, and receiving a pressure response associated with the pressure wave in a second well extending into the formation. The method also includes determining, based on the pressure response in the second well, information associated with the formation and/or a fracture connected to at least one of the first and second wells.

The present disclosure also introduces an apparatus including a processing system comprising a processor and a memory including computer program code executable by the processor. The computer program code is executable by the processor for, after a pressure wave has been generated within a first well extending into a subterranean formation, receiving a pressure response associated with the pressure wave in a second well extending into the formation. The computer program code is also executable by the processor for determining, based on the pressure response in the second well, information associated with at least one of the formation and/or a fracture connected to at least one of the first and second wells.

The present disclosure also introduces an apparatus including a non-transitory, tangible, computer-readable medium having instructions encoded thereon for causing a processing system having a processor and a memory to, after a pressure wave has been generated within a first well extending into a subterranean formation, receive a pressure response associated with the pressure wave in a second well extending into the formation. The instructions are also for causing the processing system to determine, based on the pressure response in the second well, information associated with at least one of the formation and/or a fracture connected to at least one of the first and second wells.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

GLOSSARY

Figure 1:
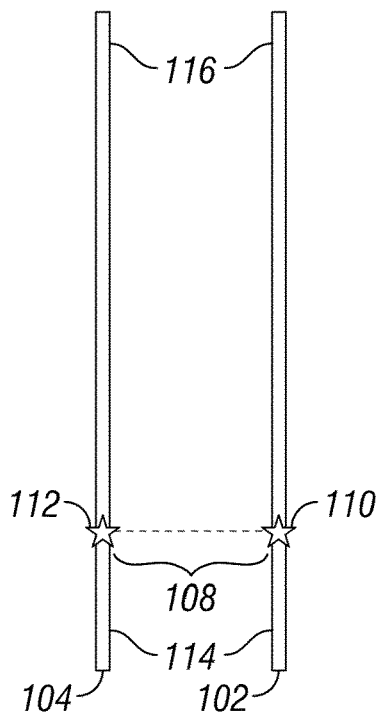
FIGS. 1 and 2 depict a fracture half-length between two wells in communication at least according to at least a portion of an example implementation according to one or more aspects of the present disclosure.

"Above," "upper," "heel," and like terms in reference to a well, wellbore, tool, formation, or other device, item, flow, or other reference point refer to the relative direction or location near, going toward, or on the surface side of the device, item, flow, or other reference point, whereas "below," "lower," "toe," and similar terms refer to the relative direction or location near, going toward, or on the bottom hole side of the device, item, flow, or other reference point, regardless of the actual physical orientation of the well or wellbore, e.g., in vertical, horizontal, downwardly, and/or upwardly sloped sections thereof.

Adjacent—at or near; next to.

Analyze—to study closely and carefully.

Annulus—a ring-like figure, structure, part, marking, area or region, such as the space between the inside surface of a large pipe and the outside surface of smaller tubing or pipe within the large pipe.

Borehole or wellbore—the portion of the well extending from the Earth's surface formed by or as if by drilling, i.e., the wellbore itself, including the cased and open-hole or uncased portions of the well.

Coiled tubing/tubing string—a well operation or system employing a long continuous length of pipe wound and unwound from a spool to lower and raise downhole tools; the continuous length of pipe used in such operations.

Confirm—to make sure or demonstrate that something is true, accurate, or justified; verify; substantiate.

Depth—includes horizontal/lateral distance/displacement.

Derived (data)—obtained from a specified source. For the avoidance of doubt, data derived from a specified source may comprise or consist of the original data per se.

Determine—to establish or ascertain definitely, as after consideration, investigation, or calculation.

Each—used to refer to every one of two or more things, regarded and identified separately.

Embodiments—non-limiting tangible or visible forms of an idea or quality according to the present disclosure.

Feature—a distinctive attribute or aspect of something.

Flow path—a passageway, conduit, porous material or the like through which fluid may pass.

Fluid communication—connection via a flow path.

Fluid hammer—a pressure surge or wave caused when a fluid in motion is suddenly forced to stop or change direction. If the fluid is water, it may be referred to as a water hammer.

Formation—a body of rock that is sufficiently distinctive and continuous that it can be mapped, or more generally, the rock around a borehole.

Fracture—a crack or surface of breakage within rock.

Fracture zone—an interval having one or more fractures treated concurrently, e.g., fractures associated with a perforation cluster and/or treated in the same stage.

Hydraulic fracturing or "fracturing"—a stimulation treatment involving pumping a treatment fluid at high pressure into a well to cause a fracture to open.

Initiate—to cause a process or action to begin.

Injection—pumping fluid through the wellbore into the reservoir for storage or to maintain pressure and/or in a flooding operation.

Interval—a space between two points or times, e.g., the space between two points in a well.

Lateral—a branch of a well radiating from the main borehole.

Map—make a diagrammatic representation of an area or region indicating physical features.

Measure—to ascertain the value, number, quantity, extent, size, amount, degree, or other property of something by using an instrument or device.

Modify—to make partial or minor changes to (something) so as to improve it or to make it less extreme.

Monitor—to observe, record or detect the progress or quality of something over a period of time; keep under systematic review for purposes of control or surveillance.

Perforation—the communication tunnel created from the casing or liner into the reservoir formation, through which fluids may flow, e.g., for stimulation and/or oil or gas production.

Pressure wave—refers to waves generated on surface and propagating along wellbore walls at the velocity approximately equal to the sound velocity in the fluid.

Progression—a movement or development toward a destination or a more advanced state, especially gradually or in stages; a succession; a series.

Receive—to convert a signal to a file, sound, visual display or other perceptible medium.

Receiver—an electrical or computer apparatus that converts a signal to a file, sound, visual display or other perceptible medium.

Reference, downhole—the lowermost plug or end of a wellbore from which most or a substantial portion of a pressure wave is reflected, e.g., a bridge plug or the bottom of the wellbore.

Reservoir—a subsurface body of rock having sufficient porosity and permeability to store and transmit fluids.

Respective—belonging or relating separately to each of two or more things.

Response—the reaction resulting from a stimulus.

Sending—cause (a message or computer file) to be transmitted electronically.

Sensing—automatically detecting or measuring something.

Sensor—a device that detects or measures a physical property and records, indicates or otherwise responds to it.

Signal—an acoustic, physical, chemical, electrical, electromagnetic, or other impulse transmitted or received.

Simulate—to create a representation or model of something, e.g., a physical system or particular situation.

Stage—a pumping sequence comprising a proppant pumping schedule and a diversion pill pumping schedule, including pads, spacers, flushes and associated treatment fluids.

Stimulation—treatment of a well to enhance production of oil or gas, e.g., fracturing, acidizing, and so on.

Treatment—the act of applying a process or substance to something to give it particular properties.

Treatment fluid—a fluid designed and prepared to resolve a specific wellbore or reservoir condition.

Well—a deep hole or shaft sunk into the earth, e.g., to obtain water, oil, gas, or brine.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following description, numerous details are set forth to provide an understanding of the present disclosure. However, it may be understood by those skilled in the art that the methods of the present disclosure may be practiced without these details and that numerous variations or modifications from the described embodiments may be possible. At the outset, it should be noted that in the development of such an actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for a conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that a conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of one or more elements that are not specifically disclosed herein.

Embodiments of the present disclosure relate to the determination of fracture geometry by tube wave analysis of well communication, or data communication among offset wells. Well communication may be explained as pressure on offset wells being affected by applied pressures on the treated well through direct fracture communication, indirect fracture communication (e.g., via two or more fractures or via one fracture and formation porosity), or through pressure communication permitted by sufficient porosity of the formation. Data communication may be explained as information obtained by sensors on offset wells that were induced by changes in the conditions of the treated well.

A tube wave is an interface wave that occurs in cased or open-hole wellbores when a Rayleigh wave encounters the wellbore and perturbs the fluid in the wellbore. A pressure wave may be a tube wave. The tube wave travels down the wellbore along the interface between the fluid in the wellbore and the wall of the wellbore (or the casing therein). A tube wave suffers little energy loss and can retain high amplitudes, and may thus interfere with reflected arrivals occurring later in time. Because the tube wave is coupled to the formation through which it is traveling, it can perturb the formation across open fractures intersecting the borehole. This squeezing effect can generate secondary tube waves that travel up and down from the fracture location. Such events can be diagnostic of the presence of open fractures, and their amplitude can be qualitatively related to length and width (or volume) of the fluid-filled fracture space.

One or more aspects of the present disclosure relate to detecting pressure or tube waves, and data related to such pressure or tube waves, in a treated well and nearby offset wells to identify fracture locations before, during, and after a fracturing operation. One or more aspects of the present disclosure may permit the identification, analysis, or generation of fracture geometry by analyzing tube waves registered in two or more offset wells that are in communication via fluids in the subterranean formation and/or fractures. For example, described herein is a method that includes generating a pressure wave within a first well extending into a formation. A pressure response in a second well extending into the formation is detected, the pressure response in the second well being associated with the pressure wave in the first well as a result of communication between the first and second wells. Such communication may be direct communication via a fracture connecting the first and second wells, indirect communication via two or more fractures collectively connecting the first and second wells, indirect communication via one fracture connected to one but not both of the first and second wells in combination with the matrix porosity of the formation, or via just the matrix porosity. Moreover, where a fracture of a first well passes close to a fracture of a second well, a geomechanical stress field around one of the fractures (known as "stress shadow") may affect the other fracture, and may thus generate or affect a pressure signal on the other well—this is an example of mechanical communication, in contrast to the hydrodynamic communication examples described above. Information associated with the fracture(s) and/or the formation is then determined based on the pressure response in the second well.

Pressure Waves

High frequency pressure monitoring or analysis of pressure waves may be used to enhance stimulation operations and remediate failure conditions.

Pressure waves herein may be produced by various types of emitters or transducers, depending on the methods of deployment from passive sources. More specifically, at a time before or after a shut-in is commenced, pressure waves can be generated on a surface using a pressure wave source. The pressure waves may be utilized by generating pressure signals from the surface and sending the pressure signals downhole from a pressure wave generator. The pressure wave source may include a storage chamber, a fast valve to permit exchange of fluid with the tube, and a system to pre-charge the chamber. The generator produces positive pulses with a chamber pressurized at a pressure above the pressure of the tube, such as up to 15,000 psi. However, one or more aspects of the present disclosure are also applicable to or readily adaptable for implementations utilizing negative pressure pulses (such as when the wellbore suddenly opens to a low-pressure chamber), pressure drops (such as a negative pressure step when flow rate is shut off), and/or other alternatives to positive pressure pulses. Examples of pressure wave sources may include, but are not limited to, fluid or water hammer after pump shutdown, surface or downhole valves operable to open or close to cause a sudden pressure differential, surface or downhole pumps operable to periodically (or otherwise) change pumping rate up and/or down (such as to generate a sweep signal), pressure pulses generated via wireline or coiled tubing equipment, low-pressure chambers (surface or downhole) that are opened to generate a low-pressure pulse, plunger systems, imploding systems, exploding systems, and other surface or downhole pressure pulsing equipment.

When pressure waves or pulses from the pressure waves reflect off a surface such as an interface, fracture, or change in a tubular medium, the resulting reflected pressure waves or pulses of pressure associated with the pressure waves may be related and/or proportional to the original wave, but may also be modified by a characteristic of reflective surface. For example, in the case of an interrogation signal generated within a wellbore, a reflective signal having the same sign as the initial interrogation signal means that the wellbore is substantially solid (e.g., at least about 90% solid). In the context of the present disclosure, a "substantially solid wellbore" means that openings other than the wellbore (such as fractures or perforations) do not add more than 5% to the wellbore cross-sectional area. For example, such additional openings may be less than one millimeter (mm) in width, and/or may generate reflection of 5% or less in relative amplitude, and/or otherwise are not significant relative to the background of positive reflection. However, an inverted reflective signal (i.e., having the opposite sign as the initial interrogation signal) implies that there may be a flowing fluid passage, which may be indicative of a number of features of a subterranean formation such as, for example, a perforation, another port in the casing for cased hole completions, or a wellbore segment for open-hole completions. A change in the wellbore diameter may also generate a reflection signal, such as where a reduction in wellbore diameter may cause a positive reflection and an increase in wellbore diameter may cause a negative reflection.

Furthermore, obstacles in the wellbore, pipe sections with different diameters, perforations and open fractures are characterized by different hydraulic impedances and serve as pressure wave reflectors. Hydraulic impedance is ratio of oscillatory pressure to oscillatory flow can be also thought as acoustic rigidity of the media. The downhole reflector's properties can be interpreted in terms of their impedances. One way to determine depths and impedances of reflectors is to generate one or several perturbations and measure travel times and amplitudes of reflected/propagated waves. Perturbation creates transient pressure and flow conditions in the well. The perturbation may be produced by rapidly removing a slug of fluid from the pressurized well by opening and closing a valve, or rapidly injecting a slug of fluid resulting in free oscillation of the well, or by the continuous action of reciprocating pumps, or by other methods that cause transient fluid flow. The pressure wave may travel down the wellbore along the interface between the fluid in the wellbore and the wall of the wellbore.

Fracture Geometry

Methods herein may permit a user to identify, determine, or generate fracture geometry by analyzing tube waves registered in two or more nearby (i.e., offset) wells. Further, a user may conduct simultaneous analysis of multiple nearby wells using the present methods. A resulting log of the well may show the measured depth of the open fracture and the measured depth of the point of well communication, also known as a "frac hit" in adjacent wells.

When a treatment fluid is placed into a well, also known as a treated well, the initial well may receive pressure from the fluid. When the pump is shut down, a pressure response may be sensed in one or more offset wells (i.e., another well located at a distance adjacent to the treated well), as a possible response to the pressure in the treated well. This "frac hit" may be a response (e.g., pressure response) in an offset well resulting from treatment to a treated well. A direct frac hit on an offset well may be sensed as a sudden increase or spike in the formation pressure, which may be monitored at a high frequency at the surface or within the treated well to obtain information through tube wave analysis. Information regarding frac hits may provide insight into analyzing fracturing treatments, and may influence the design of fracture treatments in wells that are in fields with tightly spaced lateral wellbores. Such information may also be used to determine the amount of diversion materials used to avoid future frac hits. In embodiments, indirect well communication via fracture fluid to effective porosity can be tracked, identified, and used to derive estimation of fracture geometry.

As described herein, a pressure wave analysis technique is utilized to assess the measured depth at which fracturing fluid is being injected into a subterranean formation for a treated well, while offset wells that receive pressure communication can be monitored to assess the measured depth at which the fracturing fluid has reached the well or fracture, indicative of a frac hit. Fracturing fluid may be injected at more than one point along a subterranean formation, generating multiple frac hits. The combination of the multiple frac hits may be extrapolated to determine, analyze, or predict fracture geometry including, but not limited to, fracture length, fracture width, fracture height, fracture orientation (e.g., azimuth), and aspects of a formation including, but not limited to, effective porosity of the formation and formation fluid compressibility. For example, through the measurement of pressure waves on at least to offset wellbores that have communicated, the minimum fracture half-length can be determined. This measurement method is discussed in greater detail below.

Figure 2:
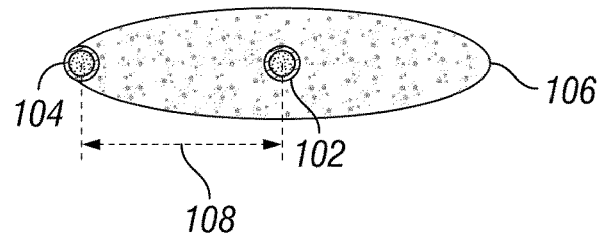

FIG. 1 and FIG. 2 depict the top view and the cross-sectional view, respectively, of a lateral wellbore having a treated well 102 and an offset well 104 in communication via a fracture 106. The treated well 102 and the offset well 104 have a heel portion 114 and a toe portion 116. Upon generation of a pressure wave (not shown), the pressure wave enters the pressure wave entrance point 110 of the treated well 102 and passes through the fracture 106 to the pressure wave entrance point 112 of the offset well 104. Through the measurement of pressure waves (not shown and discussed in greater detail below) on at least the treated well 102 and offset well 104, one can determine if the treated well 102 and the offset well 104 are in communication with one another and further determine the fracture half-length 108 of the fracture 106, which is at least the distance between the treated well 102 and the offset well 104.

Figure 3:
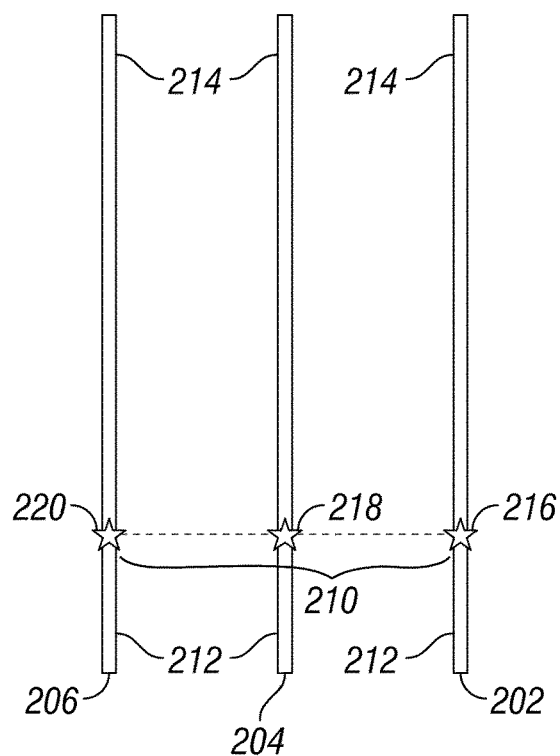
FIGS. 3 and 4 depict fracture half-lengths for three wells with the wells in communication at least according to at least a portion of an example implementation according to one or more aspects of the present disclosure.
Figure 4:
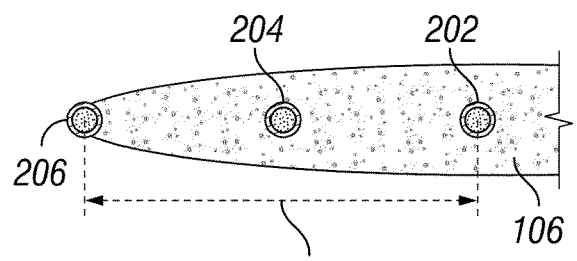

FIG. 3 and FIG. 4, depict the top view and cross-sectional view, respectively, of three wells (a treated well 202, a first offset well 204 and a second offset well 206), each in communication with one another via a fracture 106 in contact with the other wells. The treated well 202, the first offset well 204 and the second offset well 206 each have a heel portion 212 and a toe portion 214. The first offset well 204 is located a shorter distance from the treated well 202 than the second offset well 206. Upon generation of a pressure wave (not shown), the pressure wave enters the pressure wave entrance point 216 of the treated well 202 and passes through the fracture 106 to both the pressure wave entrance point 218 of the first offset well 204 and the pressure wave entrance point 220 of the second offset well 206. In one embodiment, if a treated well 202 is in communication with first offset well 204 and a second offset well 206, one can determine the fracture half-length 210 of the fracture 106, which is at least the distance between treated well 202 and the second offset well 206.

Figure 5:
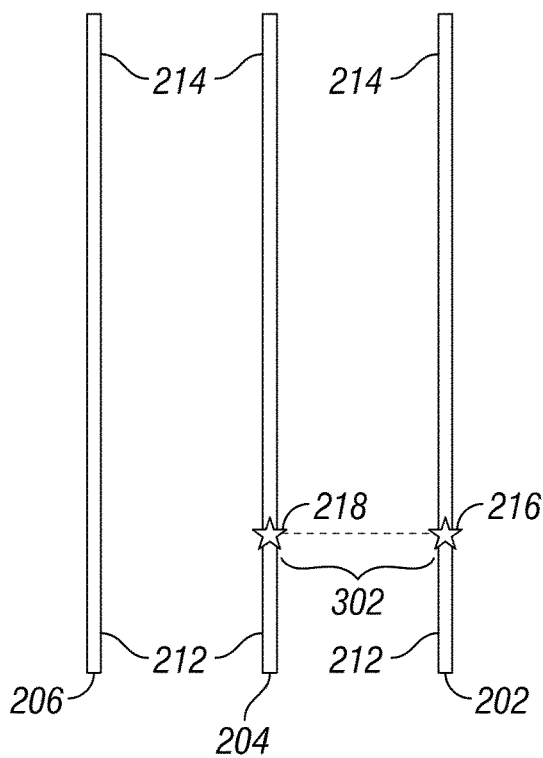
FIGS. 5 and 6 depict fracture half-lengths for three wells with two wells in communication at least according to at least a portion of an example implementation according to one or more aspects of the present disclosure.
Figure 6:
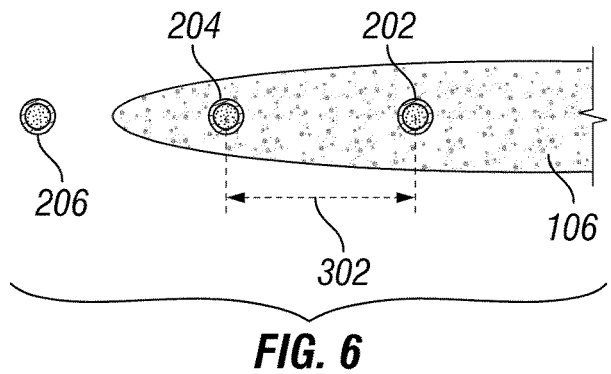

FIG. 5 and FIG. 6, depict the top view and cross-sectional view, respectively, of three wells (a treated well 202, a first offset well 204 and a second offset well 206). However, in this case, the treated well 202 and the first offset well 204 are in communication with each other via a fracture 106, but neither is in communication with the second offset well 206. Upon generation of a pressure wave (not shown), the pressure wave enters the pressure wave entrance point 216 of the treated well 202 and passes through the fracture 106 to the pressure wave entrance point 218 of the first offset well 204. The fracture half-length 302 of the fracture 106 may then be determined as at least the distance between the treated well 202 and the first offset well 204. The fracture half-length 302 does not reach the second offset well 206.

Figure 7:
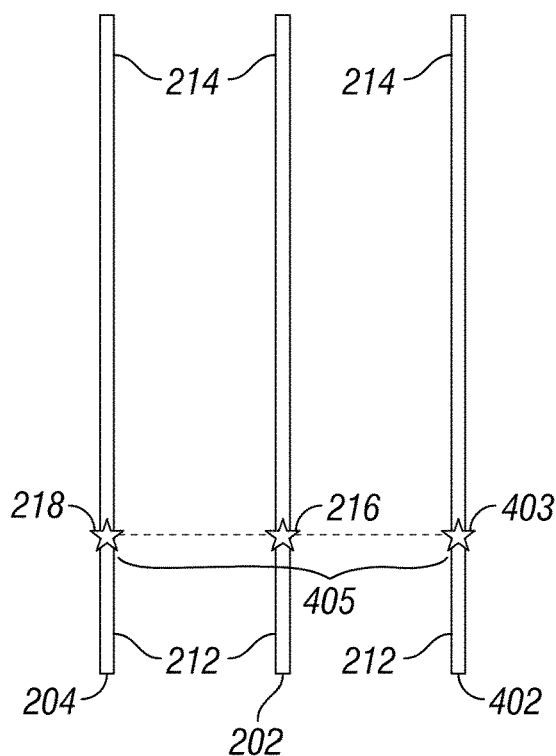
FIGS. 7 and 8 depict full fracture lengths for three wells with the wells in communication at least according to at least a portion of an example implementation according to one or more aspects of the present disclosure.
Figure 8:
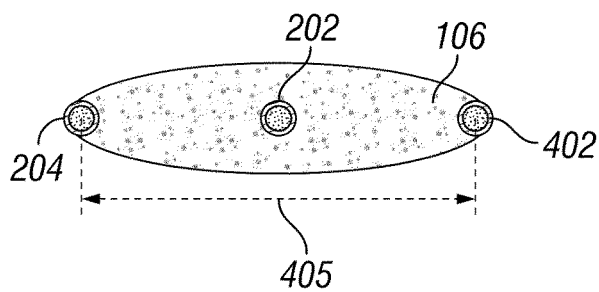

FIG. 7 and FIG. 8, depict the top view and cross-sectional view, respectively, of three wells (a treated well 202, a first offset well 204 and a second offset well 402), each in communication with one another via a fracture 106 in contact with the other wells. The first offset well 204 and the second offset well 402 are arranged at a predetermined distance from the treated well 202, the treated well being located centrally to the first offset well 204 and the second offset well 402. Upon generation of a pressure wave (not shown), the pressure wave enters the pressure wave entrance point 216 of the treated well 202 and passes through the fracture 106 to both the pressure wave entrance point 218 of the first offset well 204 and the pressure wave entrance point 403 of the second offset well 402. The derived full fracture length 405 of the fracture 106 may then be determined as at least the distance between the first offset well 204 and the second offset well 402.

Figure 9:
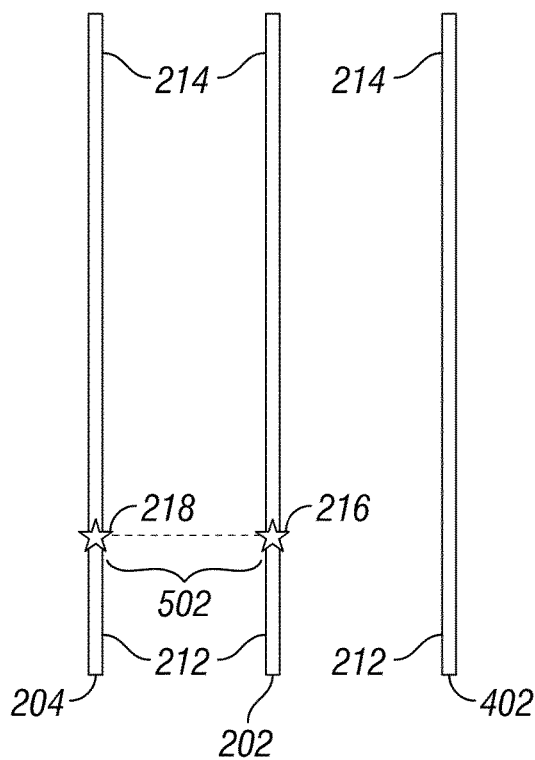
FIGS. 9 and 10 depict full fracture lengths for three wells with two wells in communication at least according to at least a portion of an example implementation according to one or more aspects of the present disclosure.
Figure 10:
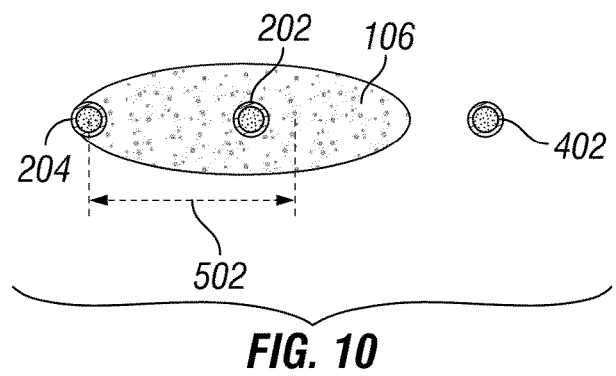

FIG. 9 and FIG. 10, depict the top view and cross-sectional view, respectively, of three wells (a treated well 202, a first offset well 204 and a second offset well 402). However, in this case, the treated well 202 and the offset well 204 are in communication with each other via a fracture 106, but neither is in communication with the second offset well 402. Upon generation of a pressure wave (not shown), the pressure wave enters the pressure wave entrance point 216 of the treated well 202 and passes through the fracture 106 to the pressure wave entrance point 218 of the first offset well 204. The full fracture length 502 of the fracture 106 may then be determined as at least the distance between the treated well 202 and the first offset well 204. The full fracture length 502 does not reach the second offset well 402.

Figure 11:
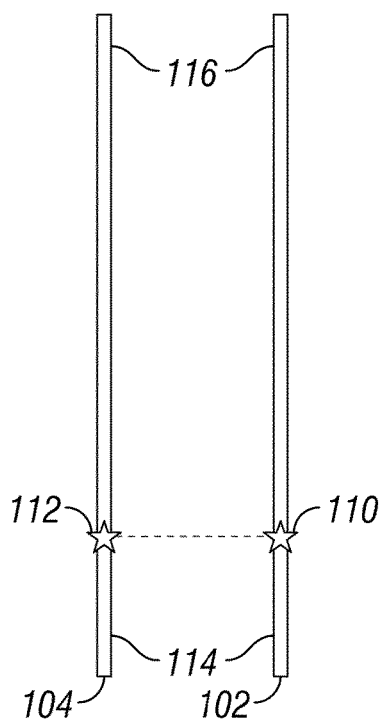
FIGS. 11 and 12 depict fracture height growth from two wells in communication at least according to at least a portion of an example implementation according to one or more aspects of the present disclosure.
Figure 12:
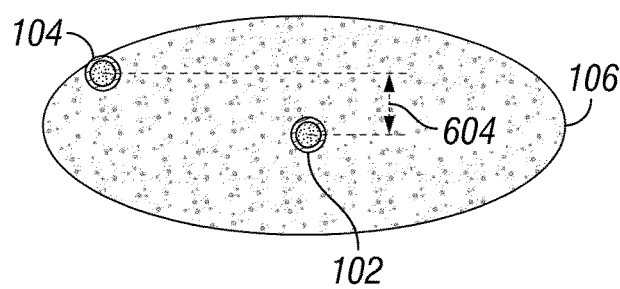

FIG. 11 and FIG. 12 depict the top view and the cross-sectional view, respectively, of a lateral wellbore having a treated well 102 and an offset well 104 in communication via a fracture 106. The fracture 106 may grow in a vertical direction at least as high as a measured point in the offset wellbore 104, permitting one to determine the minimum fracture height (e.g., based on the pressure wave amplitude 604). Geosteering logs may indicate how far apart wells are located by considering where frac hits occur.

Figure 13:
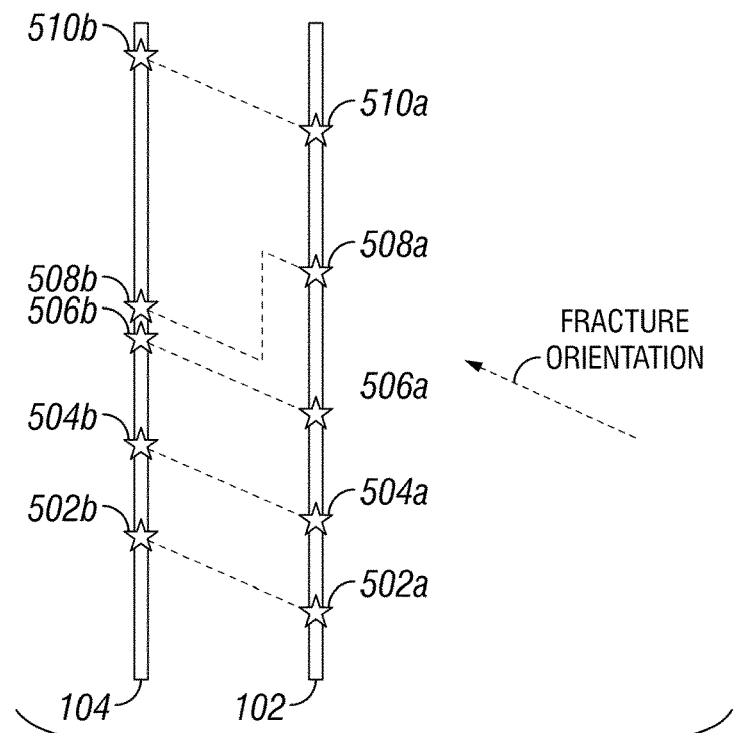
FIG. 13 depicts fracture growth orientation from two wells at least according to at least a portion of an example implementation according to one or more aspects of the present disclosure.

FIG. 13 depicts the top view of a treated well 102 and an offset well 104 in communication via a fracture (not shown). Through the measurement of tube waves on only two nearby wells in communication, information associated with general fracture orientation can be determined. Similar to as stated above, geosteering logs may be used to determine orientation of fracture angle between wells.

Generally, if wells communicate, as the treated well 102 and the offset well 104 are in communication via a fracture, for example, the fracture grows in an orientation that connects or correlates frac points 502a, 504a, 506a, 508a, 510a on the treated well 102 to response points 502b, 504b, 506b, 508b, 510b on the offset well 104, respectively. Frac points 502a, 504a, 506a, 508a, 510a may correspond to points within a well or along a wellbore where fracturing occurs, such as before or after period(s) of diversion. The measured points 502b, 504b, 506b, 508b, 510b on the offset well 104 may correspond to frac hits or pressure responses.

The determination of fracture geometry, such as fracture length, width, and height, may take into consideration factors such as the speed of tube waves within the fracture and period between waves, for example. The speed of waves, together with measured reflection coefficient, can be used to reconstruct fracture geometrical parameters. For example, reconstruction of the fracture geometry may be performed via solving of inverse problem of pressure wave traveling from the formation through the fracture to the wellbore. Such problem may be solved utilizing the recorded full waveform of the pressure wave (not just its period) and the geophysical properties of the formation, such as Young's modulus, various stresses, pore pressure, porosity, permeability, type of formation, pore-elasticity parameters, and/or others. Such solution may also depend on knowledge of the material (e.g., proppant) filling the fracture, such as the mechanical properties and permeability of the filling material, to determine velocity of the wave inside the fracture. The above-described determinations may be at least similar to one or more aspects described in (1) "Properties of low-frequency trapped mode in viscous fluid waveguides," Nikitin, A., Plyushchenkov, B., and Segal, A. (2016), Geophysical Prospecting, (2) "Stoneley Wave Properties in a Fracture Filled with Viscous Fluid," Nikitin, A., Plyushchenkov, B., and Segal, A. (2013), Poromechanics V: pp. 183-192, DOI: 10.1061/9780784412992.021, and/or (3) "Low-Frequency Stoneley Wave in Poroelastic Waveguides," A. Segal, A. Nikitin, and B. Plyushchenkov, 75th EAGE Conference & Exhibition incorporating SPE EUROPEC 2013, Session: Fractured Reservoirs, DOI: 10.3997/2214-4609.20130807, herein referred to as "the Nikitin, Plyushchenkov, and Segal references," the entirety of each being hereby incorporated herein by reference. However, even without a highly accurate reconstruction, the pressure wave velocity may be estimated based on knowledge of the type and mechanical properties of the formation and the geometry and mechanical properties of the wellbore (including of the casing and cement in cased-hole implementations).

The depths of entrance points in the treated well and exit points in the offset well may be determined from analysis of time delays between direct waves such as indicated by points 502a, 504a, 506a, 508a, 510a and reflected waves such as indicated by points 502b, 504b, 506b, 508b, 510b, respectively. However, the depths of entrance points in the treated well and exit points in the offset well may also or instead be determined from analysis of the pressure wave period. Fracture geometry, such as length, may be reconstructed from relative wellbore positions and fracture entrance/exit points as previously mentioned.

Generally, a greater number of monitored wells with well communication in the form of frac hits may generate better estimations of fracture half lengths, full fracture lengths, fracture height growth and/or fracture growth orientation. Additionally, further mapping of the fracture geometry can be deduced from the pressure wave signature passed through a fracture for formation effective porosity into a monitored offset well. A delay in a pressure wave between wells may be indicative of the fracture path length, and an amplitude of a pressure wave may be indicative of fracture geometry. In addition, an amplitude of a pressure wave may be affected by deflection and/or attenuation internally within a formation.

Along with the monitoring of pressure waves on multiple communicating wells, it is conceivable to make real-time changes to a pumping schedule or job design for hydraulic fracturing based on pressure responses in the monitored offset wells. For example, a well may be treated until monitored offset wells sense a pressure response. In such cases, pumping can be ceased or flushing can occur at the treated well.

Figure 14:
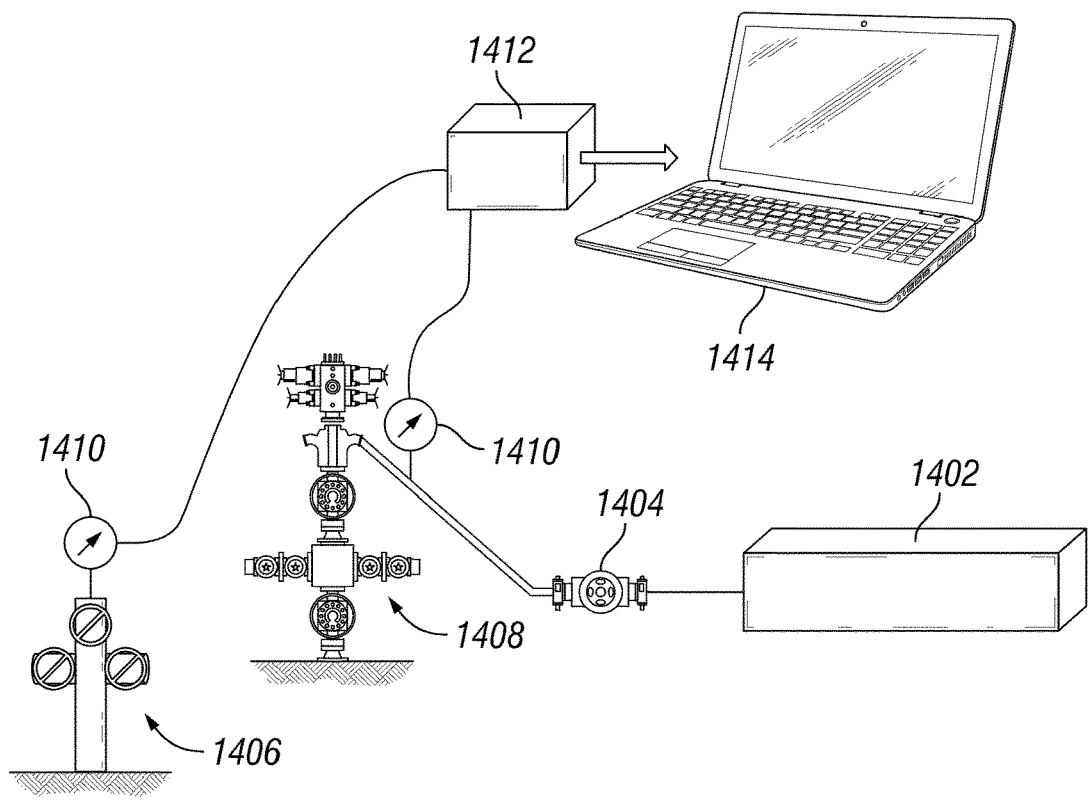
FIG. 14 depicts illustrates a general schematic of the tube wave acquisition and analysis workflow at least according to at least a portion of an example implementation according to one or more aspects of the present disclosure.

FIG. 14 illustrates a general schematic of the tube wave acquisition and analysis workflow. Pressure pulses or tube waves may be initiated by shutting down one or more pumps 1402 or by shifting valves 1404 connected to pumps 1402. The pumps 1402 may be fracturing pumps, other positive displacement pumps, and/or other examples. However, other pumps, valves, and/or other means may also or instead be utilized to abruptly change a flow rate and thereby generate the pressure pulses or tube waves. Pressure pulses may also occur by the generation of one or more frac hits on the offset well 1406. Pressure data is simultaneously collected from the treated well 1408 and offset well 1406 via pressure transducers 1410 connected to a high frequency pressure data acquisition box 1412 where the data can be digitized and read by a computer 1414. A user can then review and analyze the acquired data and then interpret the data to make informed decisions about steps to take in adjusting treating operations.

Figure 15:
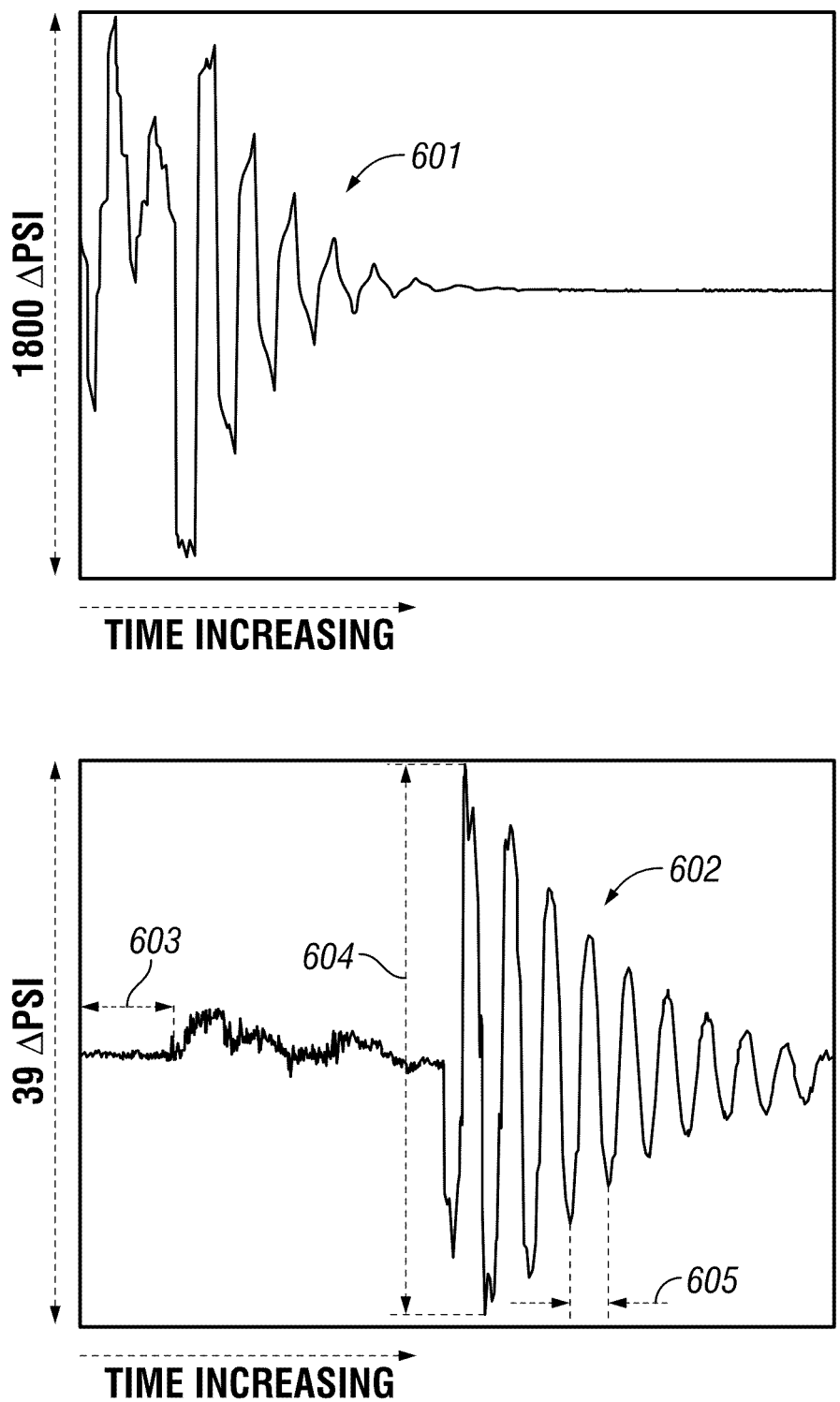
FIG. 15 depicts a pressure graph at least according to at least a portion of an example implementation according to one or more aspects of the present disclosure.

FIG. 15 provides an example of how pressure pulses present themselves in the treated well and offset well at the same time by comparing the surface pressure of a treated well to an offset well. In this example, a plurality of pressure pulses of about 300 to about 1800 psi were generated in the treated well from a pump shut down (i.e., a water hammer), as depicted in FIG. 15 by the example pressure wave 601 in the upper plot having a y-axis spanning a pressure range of about 1800 psi. Because the treated well and offset well are in communication, such as by a fracture hydraulically connecting the treated well and the offset well, the pressure pulse is transmitted into the offset well and seen by the pressure transducer, as depicted in FIG. 15 by the example pressure wave 602 in the lower plot having a y-axis spanning a pressure range of about 39 psi.

FIG. 15 also depicts the delay 603 between the treated well pressure wave 601 and the offset well pressure wave 602 (e.g., about 30 seconds in the depicted example), as well as the amplitude 604 and period 605 of the offset well pressure wave 602. The delay 603 of the offset well pressure wave 602 can provide information about the fracture length and the "directness" of the frac hit. The amplitude 604 of the offset well pressure wave 602, relative to the treated well pressure wave 601, which can provide information about the fracture width and friction within the fracture. The period 605 of the offset well pressure wave 602 can provide information about the measured depth at which the fracture is open in the treated well and the measured depth of where the fracture is open, and therefore where the frac hit occurred, on the offset well.

For example, the pressure wave velocity inside the fracture may be determined based on the mechanical properties of the formation, fluid compliance, and closure stresses. The wave velocity in the wellbore may also be determined based on, for example, the fluid properties and the mechanical properties of the formation (and the casing and cement, where applicable). The period 605 may be utilized to determine the time for the signal to reach the surface from frac hit point (such as about 25% of the period 605). The wellbore wave velocity may be utilized to determine the depth and perhaps "directness" of the hit. Subtracting the signal-to-surface time from the delay 603 yields the time taken by the wave to travel from wellbore to wellbore. This time information, together with the determinations for wave velocity in the fracture, can then be utilized to estimate the geometry of the fracture. Such determinations may be at least similar to one or more aspects described in the Nikitin, Plyushchenkov, and Segal references. That is, the theory described in the Nikitin, Plyushchenkov, and Segal references provides examples for predicting characteristics (e.g., attenuation, velocity, reflection coefficients, etc.) of the pressure wave passing the fracture or layered formation based on fracture geometry and mechanical properties. By solving the inverse problem, the fracture geometry can be determined from the measured wave speed (e.g., utilizing the delay 603) and the wave attenuation (e.g., utilizing the amplitude 604). However, other methods for determining the fracture geometry utilizing the delay 603, the amplitude 604, the period 605, and/or other data are also within the scope of the present disclosure.

Figure 16:
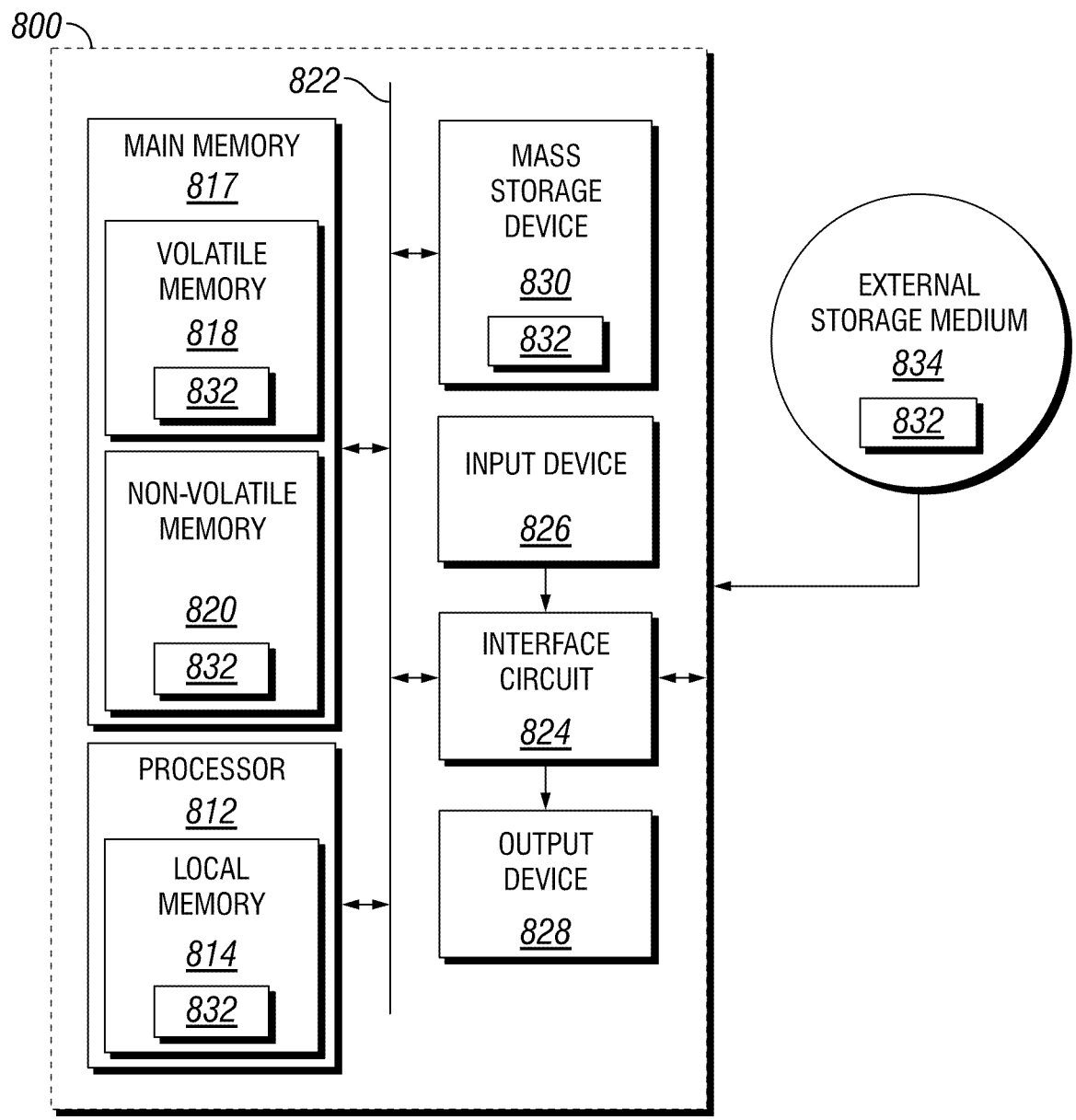
FIG. 16 is a schematic view of at least a portion of an example implementation of apparatus according to one or more aspects of the present disclosure.

FIG. 16 is a schematic view of at least a portion of an example implementation of a processing system 800 according to one or more aspects of the present disclosure. The processing system 800 may execute example machine-readable instructions to implement at least a portion of one or more of the methods and/or processes described herein, and/or to implement a portion of one or more of the example downhole tools described herein. The processing system 800 may be or comprise, for example, one or more processors, controllers, special-purpose computing devices, servers, personal computers, personal digital assistant (PDA) devices, smartphones, internet appliances, and/or other types of computing devices. One or more instances of the processing system 800, or subsets of the components thereof, may form the computer 1414 depicted in FIG. 14.

The processing system 800 may comprise a processor 812, such as a general-purpose programmable processor, for example. The processor 812 may comprise a local memory 814, and may execute program code instructions 832 present in the local memory 814 and/or another memory device. The processor 812 may execute, among other things, machine-readable instructions or programs to implement the methods and/or processes described herein. The programs stored in the local memory 814 may include program instructions or computer program code that, when executed by an associated processor, cause a controller and/or control system implemented in surface equipment and/or a downhole tool to perform tasks as described herein. The processor 812 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 812 may be in communication with a main memory 817, such as via a bus 822 and/or other communication means. The main memory 817 may comprise a volatile memory 818 and a non-volatile memory 820. The volatile memory 818 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 820 may be, comprise, or be implemented by read-only memory, flash memory, and/or other types of memory devices. One or more memory controllers (not shown) may control access to the volatile memory 818 and/or the non-volatile memory 820.

The processing system 800 may also comprise an interface circuit 824. The interface circuit 824 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 824 may also comprise a graphics driver card. The interface circuit 824 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 826 may be connected to the interface circuit 824. One or more of the input devices 826 may permit a user to enter data and/or commands for utilization by the processor 812. Each input device 826 may be, comprise, or be implemented by a keyboard, a mouse, a touchscreen, a trackpad, a trackball, an image/code scanner, and/or a voice recognition system, among other examples.

One or more output devices 828 may also be connected to the interface circuit 824. One or more of the output devices 828 may be, comprise, or be implemented by a display device, such as a liquid crystal display (LCD), a light-emitting diode (LED) display, and/or a cathode ray tube (CRT) display, among other examples. One or more of the output devices 828 may also or instead be, comprise, or be implemented by a printer, speaker, and/or other examples.

The processing system 800 may also comprise a mass storage device 830 for storing machine-readable instructions and data. The mass storage device 830 may be connected to the interface circuit 824, such as via the bus 822. The mass storage device 830 may be or comprise a floppy disk drive, a hard disk drive, a compact disk (CD) drive, and/or digital versatile disk (DVD) drive, among other examples. The program code instructions 832 may be stored in the mass storage device 830, the volatile memory 818, the non-volatile memory 820, the local memory 814, and/or on a removable storage medium 834, such as a CD or DVD.

The mass storage device 830, the volatile memory 818, the non-volatile memory 820, the local memory 814, and/or the removable storage medium 834 may each be a tangible, non-transitory storage medium. The modules and/or other components of the processing system 800 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces a method comprising: (A) generating a pressure wave within a first well extending into a subterranean formation; (B) receiving a pressure response associated with the pressure wave in a second well extending into the formation; and (C) determining, based on the pressure response in the second well, information associated with at least one of: (i) the formation; and/or (ii) a fracture connected to at least one of the first and second wells.

The first and second wells may be in direct communication by way of the fracture.

The first and second wells may be in indirect communication by way of the fracture and at least one of another fracture and/or porosity of the formation.

The first and second wells may be in communication by way of porosity of the formation.

The determined information may be associated with the fracture and may comprise fracture length, fracture width, fracture height, fracture orientation, fracture azimuth, or a combination thereof.

The determined information may be associated with the formation and may comprise effective porosity of the formation, formation fluid compressibility, or a combination thereof.

The pressure wave may be a tube wave.

The pressure wave may be generated by a pressure wave source comprised of at least a storage chamber, a fast valve to permit exchange of fluid with the tube, and a system to pre-charge the chamber.

The method may further comprise receiving additional pressure responses in each of a plurality of third wells each extending into the formation, wherein each additional pressure response may be associated with the pressure wave, and wherein the determined information may be based on the pressure response in the second well and the additional pressure responses in the third wells. For example, determining the information associated with the formation and/or the fracture may comprise simultaneously utilizing the pressure response in the second well and the additional pressure responses in the third wells.

The information may be determined based upon one or more frac hits. For example, the one or more frac hits may be extrapolated to determine, analyze, or predict geometry of the fracture.

The fracture may grow in an orientation that connects or correlates a plurality of frac points of the first well to a plurality of response points of the second well.

The first well may be a treated well and the second well may be an offset well.

The pressure response may be a first pressure response, the method may further comprise receiving a second pressure response associated with the pressure wave in a third well extending into the formation, and the determined information may be based on the first and second pressure responses. For example, the first well may be a treated well, and the second and third wells may be offset wells.

The present disclosure also introduces an apparatus comprising a processing system comprising a processor and a memory including computer program code executable by the processor for: (A) after a pressure wave has been generated within a first well extending into a subterranean formation, receiving a pressure response associated with the pressure wave in a second well extending into the formation; and (B) determining, based on the pressure response in the second well, information associated with at least one of: (i) the formation; and/or (ii) a fracture connected to at least one of the first and second wells.

The computer program code may be further executable by the processor for generating the pressure wave within the first well.

The first and second wells may be: (A) in direct communication by way of the fracture; (B) in indirect communication by way of the fracture and at least one of: (i) another fracture; and/or (ii) porosity of the formation; or (C) in communication by way of the porosity of the formation.

The pressure wave may be a tube wave.

The computer program code may be further executable by the processor for receiving additional pressure responses in each of a plurality of third wells each extending into the formation, where each of the additional pressure responses may be associated with the pressure wave, and the determined information may be based on the pressure response in the second well and the additional pressure responses in the third wells.

The present disclosure also introduces an apparatus comprising a non-transitory, tangible, computer-readable medium having instructions encoded thereon for causing a processing system having a processor and a memory to: (A) after a pressure wave has been generated within a first well extending into a subterranean formation, receive a pressure response associated with the pressure wave in a second well extending into the formation; and (B) determine, based on the pressure response in the second well, information associated with at least one of: (i) the formation; and/or (ii) a fracture connected to at least one of the first and second wells.

The instructions may further cause the processing system to generate the pressure wave within the first well.

The first and second wells may be: (A) in direct communication by way of the fracture; (B) in indirect communication by way of the fracture and at least one of: (i) another fracture; and/or (ii) porosity of the formation; or (C) in communication by way of the porosity of the formation.

The instructions may further cause the processing system to receive additional pressure responses in each of a plurality of third wells each extending into the formation, where each additional pressure response may be associated with the pressure wave, and the determined information may be based on the pressure response in the second well and the additional pressure responses in the third wells.

Although only a few example embodiments have been described in detail above, those skilled in the art will readily appreciate that many modifications are possible in the example embodiments without materially departing from this invention. Accordingly, each such modification is intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 for a limitation recited in the claims herein.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method of identifying fracture geometry associated with a fracturing operation, the method comprising:
    performing the fracturing operation in a first well extending into a subterranean formation, wherein the fracturing operation generates a pressure wave within the first well;
    receiving, via one or more sensors at the first well, a first pressure response associated with the pressure wave in the first well;
    receiving, via one or more sensors at one or more offset wells extending into the subterranean formation, one or more additional pressure responses associated with the pressure wave the one or more offset wells, the one or more additional pressure responses including at least a second pressure response associated with the pressure wave in a first offset well of the one or more offset wells;
    determining, based on the first pressure response and the one or more additional pressure responses, a presence or absence of a fracture between the first well and each of the one or more offset wells, the determining including determining the presence of the fracture between the first well and the first offset well based on the first pressure response and the second pressure response;
    determining, based on the first pressure response, the one or more additional pressure responses, and one or more distances between the first well and the one or more offset wells, a portion of a length of the fracture;
    determining one or more parameters of the first pressure response, wherein the one or more parameters include at least one of: an arrival time of the pressure wave at the first well or an amplitude of the pressure wave at the first well;
    determining one or more parameters of the second pressure response, wherein the one or more parameters of the second pressure response include at least one of: an arrival time of the pressure wave at the first offset well or an amplitude of the pressure wave at the first offset well;
    determining, based on the one or more parameters of the first pressure response and the one or more parameters of the second pressure response, a first depth of an entrance point of the pressure wave from the first well to the fracture and a second depth of an exit point of the pressure wave to the first offset well from the fracture;
    generating, based on the one or more parameters of the first pressure response, the one or more parameters of the second pressure response, the first determined depth, and the second determined depth, an indication of fracture geometry associated with at least one of: the subterranean formation or the fracture; and
    outputting information associated with the fracture geometry to a user.

2. The method of claim 1, wherein:
    the indication of the fracture geometry is associated with the subterranean formation; and
    the indication comprises at least one of: an indication of effective porosity of the subterranean formation or an indication of formation fluid compressibility.

3. The method of claim 1, further comprising determining, based on the one or more parameters of the first pressure response, the one or more parameters of the second pressure response, the first determined depth, and the second determined depth, a quantity of diversion material for a second fracturing operation that minimizes a respective pressure response associated with an additional pressure wave that would be generated by the second fracturing operation in the first well.

4. The method of claim 3, further comprising performing the second fracturing operation in the first well based on the determined quantity of the diversion material.

5. The method of claim 1, further comprising at least one of:
adjusting the fracturing operation in the first well based on the second pressure response; or
adjusting a second fracturing operation in the first well based on the second pressure response.

6. An apparatus for identifying fracture geometry associated with a well fracturing operation, the apparatus comprising:
a processing system that includes:
a processor; and
a memory, the memory including machine-readable instructions that, when executed by the processor, cause the processor to perform operations, the operations comprising:
receiving, via one or more sensors at a first well extending into a subterranean formation, a first pressure response associated with a pressure wave generated in the first well by a fracturing operation in the first well;
receiving, via one or more sensors at one or more offset wells extending into the subterranean formation, one or more additional pressure responses associated with the pressure wave in the one or more offset wells, the one or more additional pressure responses including at least a second pressure response associated with the pressure wave in a first offset well of the one or more offset wells;
determining, based on the first pressure response and the one or more additional pressure responses, a presence or absence of a fracture between the first well and each of the one or more offset wells, the determining including determining the presence of the fracture between the first well and the first offset well based on the first pressure response and the second pressure response;
determining, based on the first pressure response, the one or more additional pressure responses, and one or more distances between the first well and the one or more offset wells, a portion of a length of the fracture;
determining one or more parameters of the first pressure response, wherein the one or more parameters of the first pressure response include at least one of: an arrival time of the pressure wave at the first well or an amplitude of the pressure wave at the first well;
determining one or more parameters of the second pressure response, wherein the one or more parameters of the second pressure response include at least one of: an arrival time of the pressure wave at the first offset well or an amplitude of the pressure wave at the first offset well;
determining, based on the one or more parameters of the first pressure response and the one or more parameters of the second pressure response, a first depth of an entrance point of the pressure wave from the first well to the fracture and a second depth of an exit point of the pressure wave to the first offset well from the fracture;
generating, based on the one or more parameters of the first pressure response, the one or more parameters of the second pressure response, the first determined depth, and the second determined depth, an indication of fracture geometry associated with at least one of: the subterranean formation or the fracture; and
outputting information associated with the fracture geometry to a user.

7. The apparatus of claim 6, wherein the one or more additional pressure responses comprise at least a third pressure response associated with the pressure wave in a second offset well, of the one or more offset wells, extending into the subterranean formation.

8. The apparatus of claim 7, the operations further comprising:
measuring one or more parameters of the third pressure response;
determining, based on the one or more parameters of the third pressure response, additional information associated with at least one of:
the subterranean formation;
the fracture connected to the first well;
a fracture connected to the second offset well; or
a fracture connected to both the first well and the second offset well; and
generating, based on the determined additional information, an additional indication of fracture geometry associated with at least one of:
the subterranean formation;
the fracture connected to the first well;
the fracture connected to the second offset well; or
the fracture connected to both the first well and the second offset well.

9. A non-transitory, computer-readable medium, comprising machine-readable instructions that, when executed by at least one processor, cause the at least one processor to perform operations for identifying fracture geometry associated with a well fracturing operation, the operations comprising:
receiving, via one or more sensors at a first well extending into a subterranean formation, a pressure response associated with a pressure wave generated in the first well by a fracturing operation in the first well;
receiving, via one or more sensors at one or more offset wells extending into the subterranean formation, one or more additional pressure responses associated with the pressure wave the one or more offset wells, the one or more additional pressure responses including at least a second pressure response associated with the pressure wave in a first offset well of the one or more offset wells;
determining, based on the first pressure response and the one or more additional pressure responses, a presence or absence of a fracture between the first well and each of the one or more offset wells, the determining including determining the presence of the fracture between the first well and the first offset well based on the first pressure response and the second pressure response;
determining, based on the first pressure response, the one or more additional pressure responses, and one or more distances between the first well and the one or more offset wells, a portion of a length of the fracture;

determining one or more parameters of the first pressure response, wherein the one or more parameters of the first pressure response include at least one of: an arrival time of the pressure wave at the first well or an amplitude of the pressure wave at the first well;

determining one or more parameters of the second pressure response, wherein the one or more parameters of the second pressure response include at least one of: an arrival time of the pressure wave at the first offset well or an amplitude of the pressure wave at the first offset well;

determining, based on the one or more parameters of the first pressure response and the one or more parameters of the second pressure response, a first depth of an entrance point of the pressure wave from the first well to the fracture and a second depth of an exit point of the pressure wave to the first offset well from the fracture;

generating, based on the one or more parameters of the first pressure response, the one or more parameters of the second pressure response, the first determined depth, and the second determined depth, an indication of fracture geometry associated with at least one of: the subterranean formation or the fracture; and outputting information associated with the fracture geometry to a user.

10. The non-transitory, computer-readable medium of claim 9, wherein the first well and the first offset well are in indirect communication by way of the fracture and at least one of:
an additional fracture; or
porosity of the subterranean formation.

11. The non-transitory, computer-readable medium of claim 9, wherein the pressure wave is a tube wave.

12. The method of claim 5, wherein adjusting the fracturing operation or the second fracturing operation comprises adjusting a pumping schedule or a job design for the fracturing operation or the second fracturing operation.

13. The method of claim 5, wherein adjusting the fracturing operation or the second fracturing operation comprises at least one of: ceasing pumping at the first well or flushing a wellbore at the first well in response to receiving the second pressure response at the first offset well.

14. The method of claim 1, wherein determining the portion of the length of the fracture comprises determining a minimum half-length of the fracture as a distance between the first well and the first offset well.

15. The method of claim 14, wherein the one or more offset wells include a second offset well, wherein the first offset well is located between the first well and the second offset well, and the method further comprises determining a half-length of the fracture as between the determined minimum half-length and a distance between the first well and the second offset well based on not receiving a pressure response at the second offset well.

16. The method of claim 1, further comprising receiving a third pressure response received at at least a second offset well of the one or more offset wells, wherein the first offset well is between the first well and the second offset well, and wherein determining the portion of the length of the fracture comprises determining a minimum half-length of the fracture as a distance between the first well and the second offset well.

17. The method of claim 1, further comprising receiving a third pressure response received at at least a second offset well of the one or more offset wells, wherein the first well is located centrally between the first offset well and the second offset well, and wherein determining the portion of the length of the fracture comprises determining a full length of the fracture as a distance between the first offset well and the second offset well.

18. The method of claim 1, wherein:
the one or more offset wells include a second offset well;
the first well is located centrally between the first offset well and the second offset well; and
determining the portion of the length of the fracture comprises determining a full length of the fracture as a distance between the first well and the first offset well based on not receiving a pressure response at the second offset well.

19. The method of claim 1, further comprising:
generating a plurality of pressure waves within the first well;
receiving a first plurality of pressure responses associated with the plurality of pressure waves in the first well;
receiving a second plurality of pressure responses associated with the plurality of pressure waves in the first offset well;
determining, based on the first plurality of pressure responses and the second plurality of pressure responses, a plurality of first depths of entrance points of the plurality of pressure waves in the first well to the fracture and a plurality of second depths of a plurality of exit points of the plurality of pressure waves in the first offset well from the fracture; and
determining, based on the plurality of first depths and the plurality of second depths at least one of: a height of the fracture, a growth of the fracture, or an orientation of the fracture.

20. The method of claim 1, wherein at least one of:
(i) the one or more parameters of the first pressure response and the one or more parameters of the second pressure response comprise the arrival time of the pressure wave; and
determining the first depth and the second depth comprises:
determining a time delay between the arrival time of the pressure wave in the first well and the arrival time of the pressure wave in the first offset well; and
determining the first depth and the second depth based on the time delay; or
(ii) the one or more parameters of the first pressure response and the one or more parameters of the second pressure response comprise the amplitude of the pressure wave, further comprising determining at least one of: a width of the fracture or friction in the fracture based on the amplitude of the pressure wave in the first well and the amplitude of the pressure wave in the first offset well.

* * * * *